(12) United States Patent
Yoshimi

(10) Patent No.: US 12,186,957 B2
(45) Date of Patent: Jan. 7, 2025

(54) MAGNETIC CLAMP DEVICE

(71) Applicant: KOSMEK LTD., Kobe (JP)

(72) Inventor: Masahiro Yoshimi, Kobe (JP)

(73) Assignee: KOSMEK LTD. (JP)

( * ) Notice: Subject to any disclaimer, the term of this patent is extended or adjusted under 35 U.S.C. 154(b) by 73 days.

(21) Appl. No.: 17/941,089

(22) Filed: Sep. 9, 2022

(65) Prior Publication Data

US 2023/0100690 A1 Mar. 30, 2023

(30) Foreign Application Priority Data

Sep. 28, 2021 (JP) ................................. 2021-158514

(51) Int. Cl.
*B29C 45/64* (2006.01)

(52) U.S. Cl.
CPC ........ *B29C 45/64* (2013.01); *B29C 2045/645* (2013.01)

(58) Field of Classification Search
CPC .......................... B29C 45/64; B29C 2045/645
USPC ....................................................... 425/589
See application file for complete search history.

(56) References Cited

FOREIGN PATENT DOCUMENTS

| JP | 2008-018546 | | 1/2008 |
|---|---|---|---|
| JP | 2008018546 A | * | 1/2008 |

OTHER PUBLICATIONS

Machined generated translation of JP 2008-018546.
Machined generated translation of JP 2008-018546, Year: 2008.

* cited by examiner

*Primary Examiner* — Jamel M Nelson
(74) *Attorney, Agent, or Firm* — Merek, Blackmon & Voorhees, LLC

(57) ABSTRACT

Provided is a magnetic clamp device that can be easily made into a state where a fall prevention function can be exerted when attaching adsorption objects.
A support member (20) is protruded horizontally from an upper part of a magnetic plate (7) of the magnetic clamp device. A protruding member (28) is protruded upward from a mold as an adsorption object that is adsorbed and fixed to an adsorption surface (8) of the magnetic plate (7). The mold (9) is arranged so that the engagement portion (32) faces the locking portion (27) with a predetermined gap above the locking portion (27) in a state where the mold (9) is adsorbed and fixed at a predetermined position on the adsorption surface (8).

6 Claims, 10 Drawing Sheets

FIG. 10A
FIG. 10B
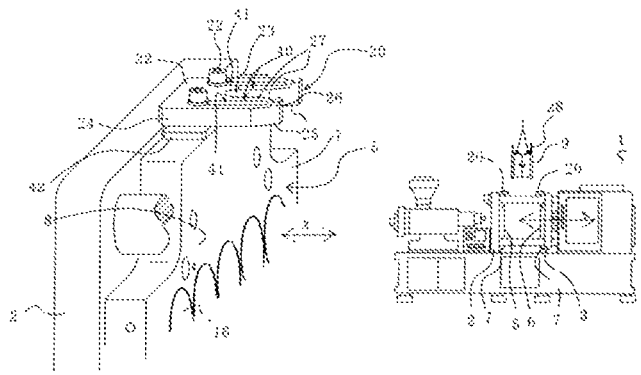
FIG. 10C
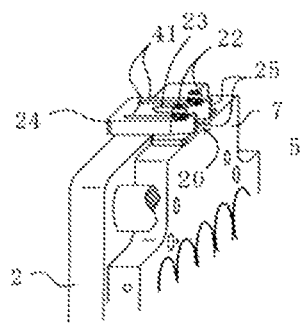
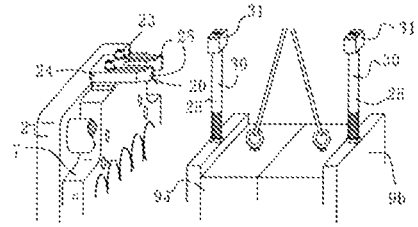
FIG. 10D
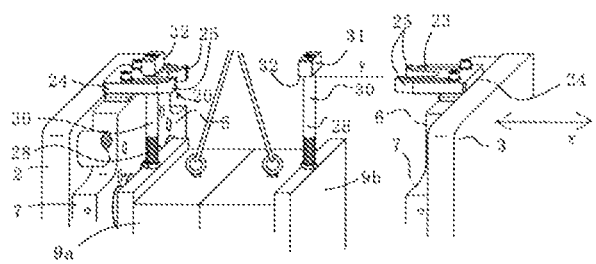
FIG. 10E
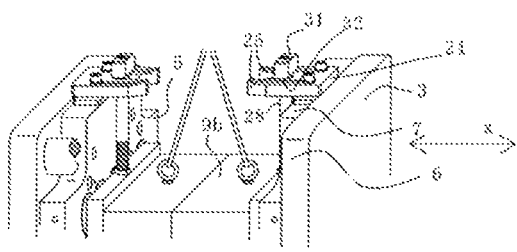

MAGNETIC CLAMP DEVICE

RELATED APPLICATION

The subject patent application claims priority from Japanese Patent Application No. 2021-158514 filed on Sep. 28, 2021 the entire contents of which are incorporated herein by reference.

TECHNICAL FIELD

The present invention relates to a magnetic clamp device for adsorbing and fixing a mold as an adsorption object to a side wall of a base by magnetic force, for example, a fixed platen or a movable platen of an injection molding machine, in particular, a magnetic clamp device having a function of preventing a mold or the like from falling from the magnetic clamp device.

Technical Field

Conventional magnetic clamp devices equipped with this type of mold fall prevention function have been described in patent literature (Japanese Patent Laid-Open No. 2008-018546). This prior art is configured as follows.

A conventional magnetic clamp device equipped with a mold fall prevention function is attached to a fixed platen and a movable platen of an injection molding machine. An adsorption surface is formed on a side wall of a housing of the magnetic clamp device, and a mold can be magnetically adsorbed on the adsorption surface. A guide groove having a T-shaped cross section is formed in a vertical direction from an upper end to a vicinity of a center so as to open on the adsorption surface. From a side surface of the mold that is in contact with the adsorption surface, an engagement protrusion having a T-shaped cross section is protruded in a perpendicular direction with respect to the side surface of the mold. The engagement protrusion can be inserted into the guide groove from an opening opened on an upper surface of the housing. When the mold is attached to the adsorption surface, first, the movable platen is moved to a position where the distance between the fixed platen and the movable platen is slightly wider than the width of the mold. Between the fixed platen and the movable platen, the mold suspended by a crane is brought in from above. Next, the engagement protrusion is inserted into the guide groove, and the engagement protrusion is received by a stopper formed on a lower end circumferential wall of the guide groove. Subsequently, the movable platen is moved toward the fixed platen, and the mold is sandwiched between the fixed platen and the movable platen, and then the mold is adsorbed and fixed to the adsorption surface by the magnetic clamp device.

DESCRIPTION OF THE PRIOR ART

Patent Documents

[Patent Document 1] Japanese Unexamined Patent Application Publication No. 2008-018546

OUTLINE OF THE INVENTION

Problems to be Solved by the Invention

The above prior art has the following problems.

In the magnetic clamp device, the guide groove is kept within the thickness of the housing of the magnetic clamp device, and the peripheral wall of the guide groove must have rigidity that can withstand the load due to the self-weight of the mold. It was difficult to set a large insertion gap between the engagement protrusion and the peripheral wall of the guide groove. Therefore, when the mold is carried in, the mold that is suspended by the crane and swings is inserted into the space formed between the fixed platen and the movable platen that is slightly wider than the dimensions of the mold. At the same time, the engaging protrusion is inserted into the guide groove, which is a narrow space. At this time, it is necessary to work carefully so that the mold and the engaging protrusions do not collide with the fixed platen, the movable platen, the peripheral device, etc. to be damaged or worn. Therefore, when the mold is attached to a magnetic plate, it took time and effort to get the mold to a state where it could perform a fall prevention function.

An object of the present invention is to provide a magnetic clamp device that can be easily put into a state where a fall prevention function can be exhibited when attaching an adsorption object.

Means for Solving Problems

A Magnetic plate 7 is provided on each side wall of the bases 2 and 3. An adsorption surface 8 is formed on the side wall of the magnetic plate 7. An adsorption object 9 is magnetically adsorbed at a predetermined position on the adsorption surface 8. A first permanent magnet 15 is inserted into a housing hole 11 formed in the magnetic plate 7. A coil 13 is wound around the outer periphery of the first permanent magnet 15. A magnetic pole member 16 adhering to the first permanent magnet 15 is composed of a magnetic material. A second permanent magnet 17 is attached between the outer peripheral surface of the magnetic pole member 16 and the inner peripheral surface of the housing hole 11. A support member 20 is protruded from the upper part of the base 2 and 3, or the magnetic plate 7 in a direction that intersects with respect to the adsorption surface 8. A protruding member 28 is protruded upward from the adsorption object 9. The protruding member 28 has an engagement portion 32. The engagement portion 32 is configured to be received from below by a locking portion 27 provided in the support member 20. The engagement portion 32 is arranged above the locking portion 27 so as to face each other with a predetermined gap in a state where the adsorption object 9 is adsorbed and fixed at a predetermined position on the adsorption surface 8.

The above invention has the following acting effects.

In the above-mentioned magnetic clamp device, the support member is protruded from the upper part of the base or the upper part of the magnetic plate in a direction intersecting the adsorption surface. Further, the protruding member is protruded upward from the adsorption object, and the engagement portion of the protruding member is configured to be received from below by the locking portion provided on the support member. Further, the engagement portion is faced with a gap above the locking portion in a state where the adsorption object is adsorbed and fixed at a predetermined position on the adsorption surface. Accordingly, when the adsorption object is attached to the magnetic plate, the adsorption object can be carried in from above in a state of being sufficiently separated from the magnetic plate in the horizontal direction so as not to collide with the magnetic plate or the like. Further, when the adsorption object is moved relative to each other in the horizontal direction so that the adsorption object and the base are brought close to each other and the adsorption object is arranged at a predetermined position on the magnetic plate, the engagement portion is faced with the locking portion with a gap above the engagement portion. Accordingly, the magnetic clamp device of the present invention can be easily attached to a predetermined position on the magnetic plate without causing the adsorption object to collide with a peripheral device such as a base to be worn or damaged. Therefore, since the engagement portion is arranged so as to face each other with a gap above the locking portion, it is possible to easily exert the fall prevention function of the adsorption object.

The present invention preferably adds the following configuration.

For example, as shown in FIGS. 7 to 9, a receiving surface 40 is formed on the upper wall of the support member 20 so as to be inclined with respect to the horizontal direction and to decrease in height as it approaches the adsorption surface 8. The locking portion 27 is provided on the receiving surface 40. A flange portion 31 protrudes from the tip end portion of the protruding member 28 in the radial direction of the protruding member 28. The lower wall of the flange portion 31 is provided with the engagement portion 32.

In this case, when the adsorption object to be adsorbed and fixed at a predetermined position on the adsorption surface of the magnetic plate is unintentionally detached from the adsorption surface, the adsorption object is received by the magnetic plate via the flange portion of the protruding member and the receiving surface of the protruding member. The adsorption object is moved to the adsorption surface side along the receiving surface by its own weight, and is adsorbed on the adsorption surface by an adsorption force of the magnetic clamp device. Therefore, it is possible to reliably prevent the adsorption object from falling from the magnetic plate and being worn or damaged.

BRIEF DESCRIPTION OF THE DRAWINGS

FIGS. 10A to 10E are diagrams showing another modification of the above embodiment.

PREFERRED EMBODIMENT OF THE INVENTION

Figure 1:
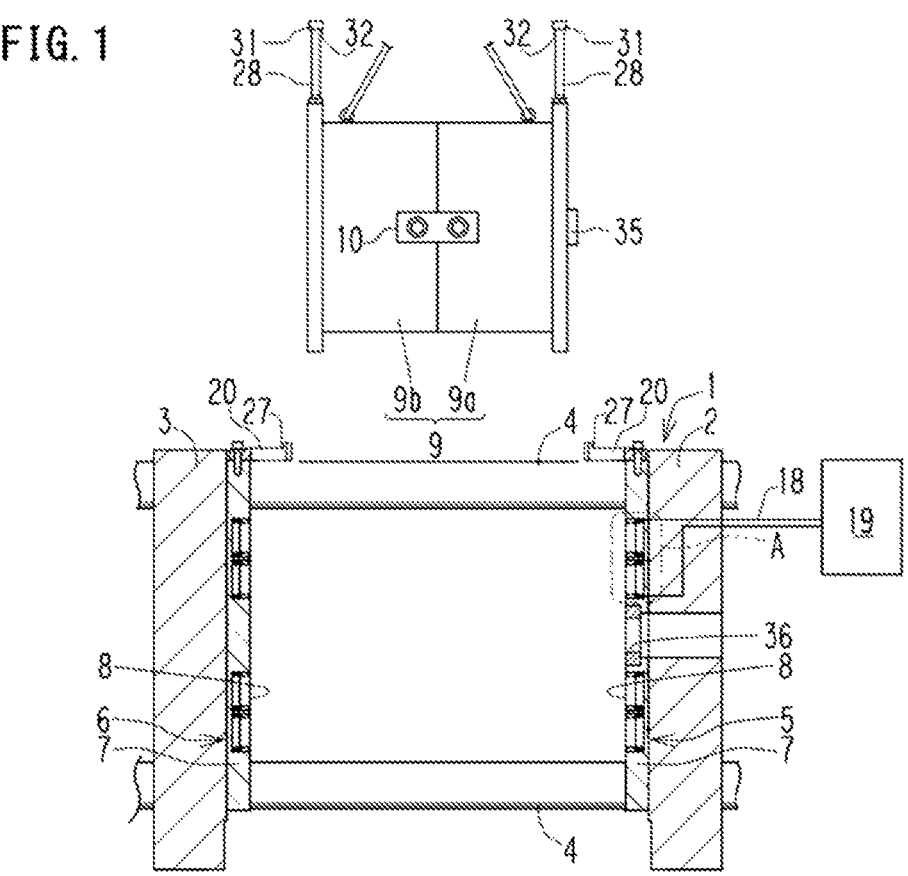
FIG. 1 shows an embodiment of the present invention, and is a partial cross-sectional view of an injection molding machine including a magnetic clamp device, and is a diagram showing an open state of the injection molding machine.

FIGS. 1 to 6 illustrate one embodiment of the present invention. An injection molding machine 1 of this embodiment includes a fixed platen (base) 2 and a movable platen (base) 3, and the movable platen 3 is moved by a drive mechanism (not shown) so as to move closer to or apart from the fixed platen 2 along four tie bars 4. A hydraulic clamping device, a magnetic clamp device, or the like can be attached to the fixed platen 2 and the movable platen 3, but in this example, magnetic clamp devices 5 and 6 are attached to the fixed platen 2 and the movable platen 3, respectively. The magnetic clamp device 5 on the fixed platen 2 side and the magnetic clamp device 6 on the movable platen 3 side have almost the same configuration, and the structure will be described with reference to FIGS. 1 and 6 based on the magnetic clamp device 5 on the fixed platen 2 side.

As shown in FIG. 1, the magnetic plate 7 as a housing of the magnetic clamp device 5 is configured of a ferromagnetic material. An adsorption surface 8 is formed on the left side wall of the magnetic plate 7, and a mold 9 can be adsorbed and fixed to the adsorption surface 8. The mold (adsorption object) 9 includes a fixed mold 9a that is adsorbed and fixed to the magnetic clamp device 5 on the fixed platen 2 side, and a movable mold 9b that is adsorbed and fixed to the magnetic clamp device 6 on the movable platen 3 side. When the mold 9 is suspended from a crane and carried into the injection molding machine 1, the fixed mold 9a and the movable mold 9b are connected by a fixing metal fitting 10.

Figure 5:
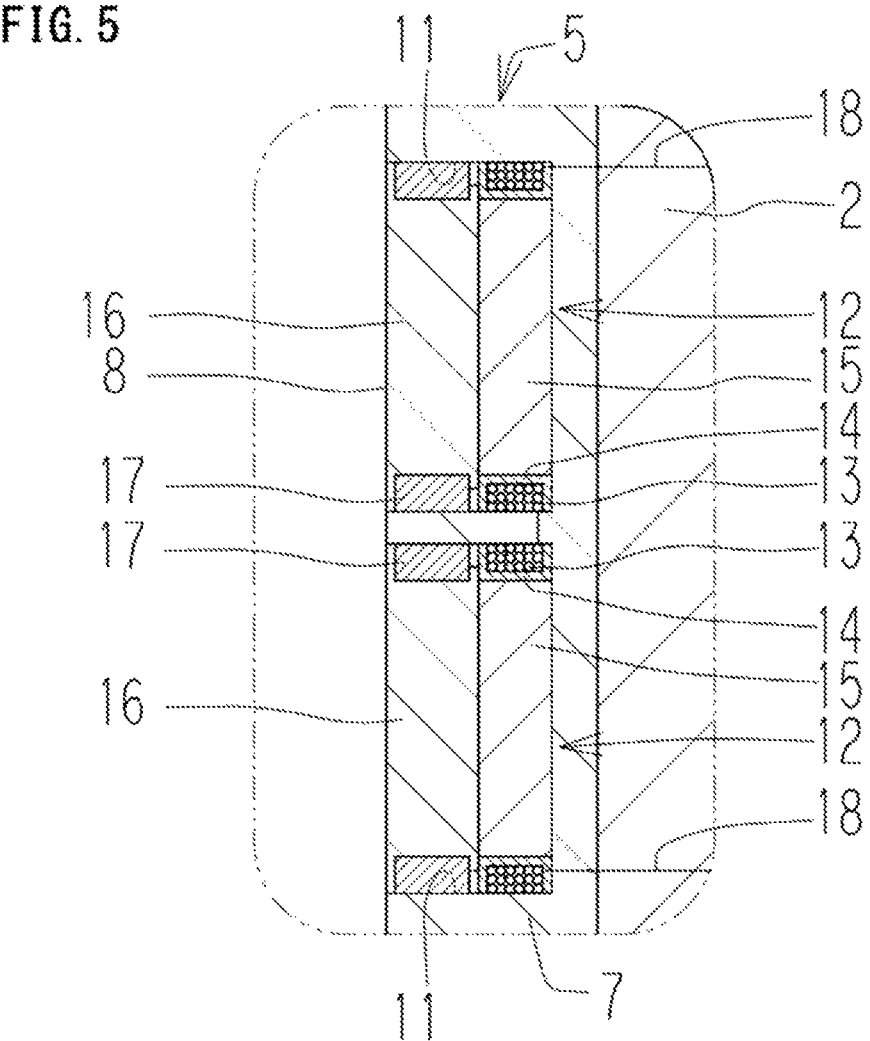
FIG. 5 is a partially enlarged view showing an A portion in FIG. 1.

As shown in FIG. 5, a plurality of housing holes 11 are formed in the magnetic plate 7 so as to open to the adsorption surface 8. A perpetuated electromagnet 12 is inserted so as to be exposed to the bottom wall of each housing hole 11. The perpetuation electromagnet 12 includes a ring-shaped bobbin 14 on which a coil 13 is wound multiple times and a cylindrical first permanent magnet 15 inserted into the cylinder hole of the bobbin 14. The first permanent magnet 15 is composed of an alnico magnet. Further, a cylindrical magnetic pole member 16 is inserted into the housing hole 11 so as to be in contact with the first permanent magnet 15. The magnetic pole member 16 is composed of a ferromagnetic material. A housing groove is formed in the circumferential direction on the outer peripheral wall of the magnetic pole member 16, and a second permanent magnet 17 is attached to the housing groove. The second permanent magnet 17 is composed of a neodymium magnet.

As shown in FIGS. 1 and 5, a plurality of coils 13 are connected by wiring 18, and the wiring 18 is connected to a magnetic control device 19. The magnetic control device 19 consists of a computer including CPU, ROM, and RAM (not shown) and a power supply unit (not shown) that supplies power to the coils 13, and so on. The magnetic control device 19 switches between a state in which the magnetic plate 7 adsorbs the mold 9 and a state in which the adsorption is released.

Figure 6:
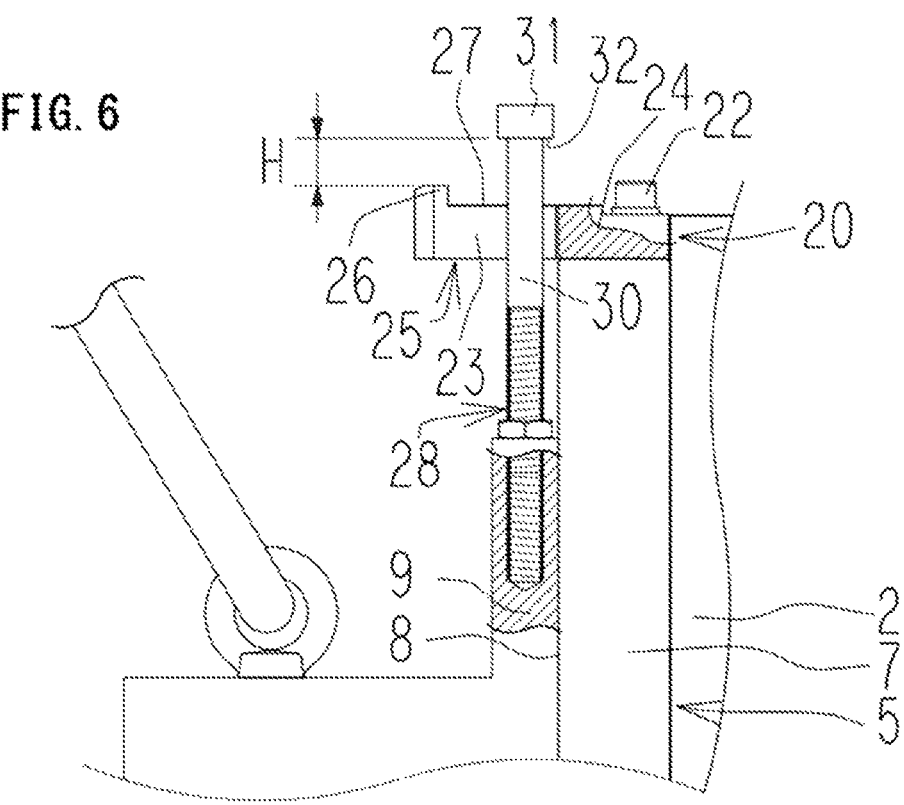
FIG. 6 is a partially enlarged view showing a B portion in FIG. 4.

As shown in FIGS. 1 and 6, the support member 20 is protruded from the upper part of the magnetic plate 7 of the magnetic clamp device 5 attached to the fixed platen 2 in a direction that intersects with reference to the adsorption surface 8 (hereinafter referred to as a crossing direction). The support member 20 is fixed to the magnetic plate 7 by a bolt 22. An insertion hole 23 is formed in the support member 20 so as to extend in the crossing direction to open on the left end surface of the support member 20. The support member 20 includes a base portion 24 attached to the magnetic plate 7 and two receiving portions 25 protruded horizontally from the base portion 24 so as to sandwich the insertion hole 23. A protrusion 26 is protruded upward from the tip of each receiving portion 25. A locking portion 27 is formed on the upper surface of the receiving portion 25.

A female screw hole is formed in the upper part of the above-mentioned mold 9 in a vertical direction, and the height can be adjusted by screwing a main body portion 30 of the protruding member 28 into the female screw hole. The main body portion 30 is fixed to the mold 9 by a nut at the height-adjusted position. Thereby, the main body portion 30 of the round rod-shaped protruding member 28 is protruded from the upper end surface of the mold 9 so as to be adjustable in height. Besides, the mold 9 is generally owned by the user of the injection molding machine 1, and the upper part of the mold 9 is later provided with the female threaded hole in the vertical direction in order to attach the protruding member 28 provided by the manufacturer of the magnetic clamp device 5. A flange portion 31 is protruded in the radial direction of the main body portion 30 from the tip end portion. An engagement portion 32 is formed on the lower surface of the flange portion 31. The main body portion 30 is configured so as to be inserted into the insertion hole 23 of the support member 20, and the engagement portion 32 of the flange portion 31 is configured so as to be received from below to the locking portion 27 of the receiving portion 25.

Figure 2:
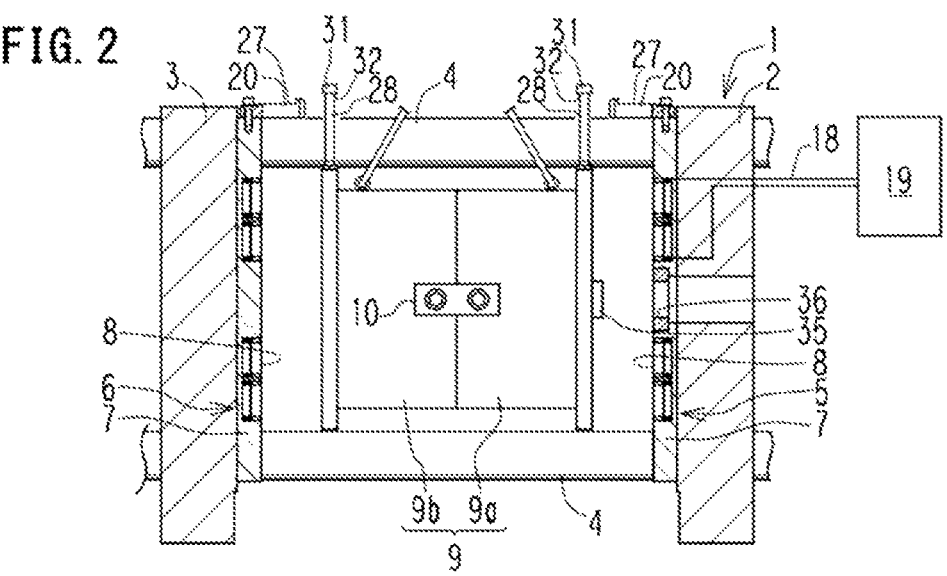
FIG. 2 is a diagram for explaining the operation of the injection molding machine, and is a diagram similar to FIG. 1.
Figure 3:
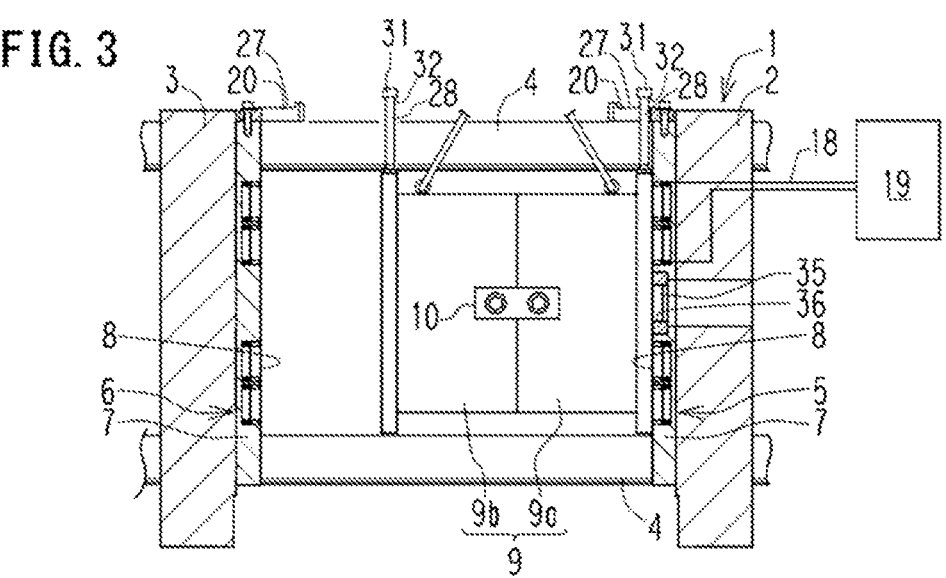
FIG. 3 is a diagram for explaining the operation of the injection molding machine, and is a diagram similar to FIG. 1.
Figure 4:
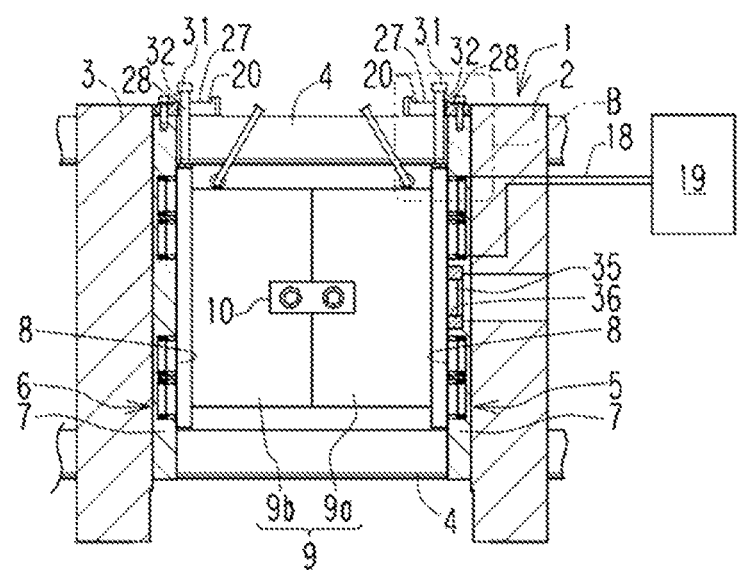
FIG. 4 is a diagram showing a mold closed state of the injection molding machine, and is a diagram similar to FIG. 1.

In order to attach the mold 9 between the fixed platen 2 and the movable platen 3 of the injection molding machine 1, first, as shown in FIGS. 1 and 2, the mold 9 suspended by the crane, in a mold open state of the injection molding machine 1 when the movable platen 3 is sufficiently separated from the fixed platen 2, is carried from above into the space formed between the fixed platen 2 and the movable platen 3. Next, the mold 9 is moved horizontally toward the magnetic plate 7 by crane operation or manual operation by the operator, and as shown in FIG. 3, a locating ring 35 attached to the side wall of the mold 9 is inserted into a guide hole 36 formed in the center of the magnetic plate 7 on the fixed platen 2 side. At this time, the main body portion 30 of the protruding member 28 provided in the fixed mold 9a of the mold 9 is inserted into the insertion hole 23 of the support member 20 of the fixed platen 2. At this time, since the lower surface (engagement portion) of the flange portion 31 of the protruding member 28 is located at a height H higher than the upper surface of the protrusion 26 of the support member 20, the protrusion 26 of the support member 20 is prevented from colliding with the flange portion 31 of the protruding member 28. Subsequently, when the operator rotates and moves the mold 9 around the central axis of a guide hole 36 to adjust the position, the mold 9 is arranged at a predetermined position on the magnetic plate 7. Next, when the movable platen 3 is moved toward the fixed platen 2, as shown in FIG. 4, the mold 9 is sandwiched by the fixed platen 2 and the movable platen 3. At this time, the main body portion 30 of the protruding member 28 fixed to the movable mold 9b of the mold 9 is inserted into the insertion hole 23 of the support member 20 attached to the movable platen 3. At this time, since an engagement portion 32 of the flange portion 31 of the protruding member 28 is located at a height H higher than the upper surface of the protrusion 26 of the support member 20, the protrusion 26 of the support member 20 is prevented from colliding with the flange portion 31 of the protruding member 28. Thereafter, the operator operates the magnetic control device 19 to adsorb and fix the mold 9 to the magnetic plate 7 with the magnetic clamp devices 5 and 6.

When the fixed mold 9a of the mold 9 magnetically fixed to the magnetic clamp device 5 or the movable mold 9b magnetically fixed to the clamping device 6 are unintentionally separated from the magnetic clamp devices 5 and 6, the fixed mold 9a or the movable mold 9b is moved downward by its own weight to be received by the magnetic clamp device 5 and 6 through the engagement portion 32 of the protruding member 28 and the locking portion 27 of the supporting member 20. This prevents the mold 9 from falling from the injection molding machine 1 and being damaged.

The above embodiment has the following advantages.

The support member 20 is protruded from the upper part of the clamp device 5 on the fixed platen 2 side and from the upper part of the clamp device 6 on the movable platen 3 side in the direction intersecting the adsorption surface 8, respectively. Further, the protruding member 28 is protruded upward from the mold 9 and is received from below by the support member 20. Further, the engagement portion 32 is faced with a gap above the locking portion 27 in a state where the mold 9 is adsorbed and fixed at a predetermined position on the adsorption surface 8. Therefore, when the mold 9 is attached to the magnetic plate 7, the mold 9 is carried in from above in a state of being sufficiently separated from the magnetic plate 7 in the horizontal direction so that the mold 9 does not collide with the magnetic plate 7 or the like. Further, by moving the fixed mold 9a relatively to the fixed platen 2a or the movable platen 3 in the horizontal direction so as to be closer to the movable mold 9b and arranging the mold 9 at a predetermined position on the magnetic plate 7, the engagement portion 32 faces the locking portion 27 with a gap upward. Therefore, in the magnetic clamp devices 5 and 6 of the present invention, the mold 9 can be attached to a predetermined position of the magnetic plate 7 without the mold 9 colliding with peripheral devices such as the fixed platen 2 or the movable platen 3 and being worn or damaged. According to this, since the engagement portion 32 is arranged so as to face each other with a gap above the locking portion 27, it can be easily made into a state where the mold fall prevention function can be demonstrated.

Figure 7:
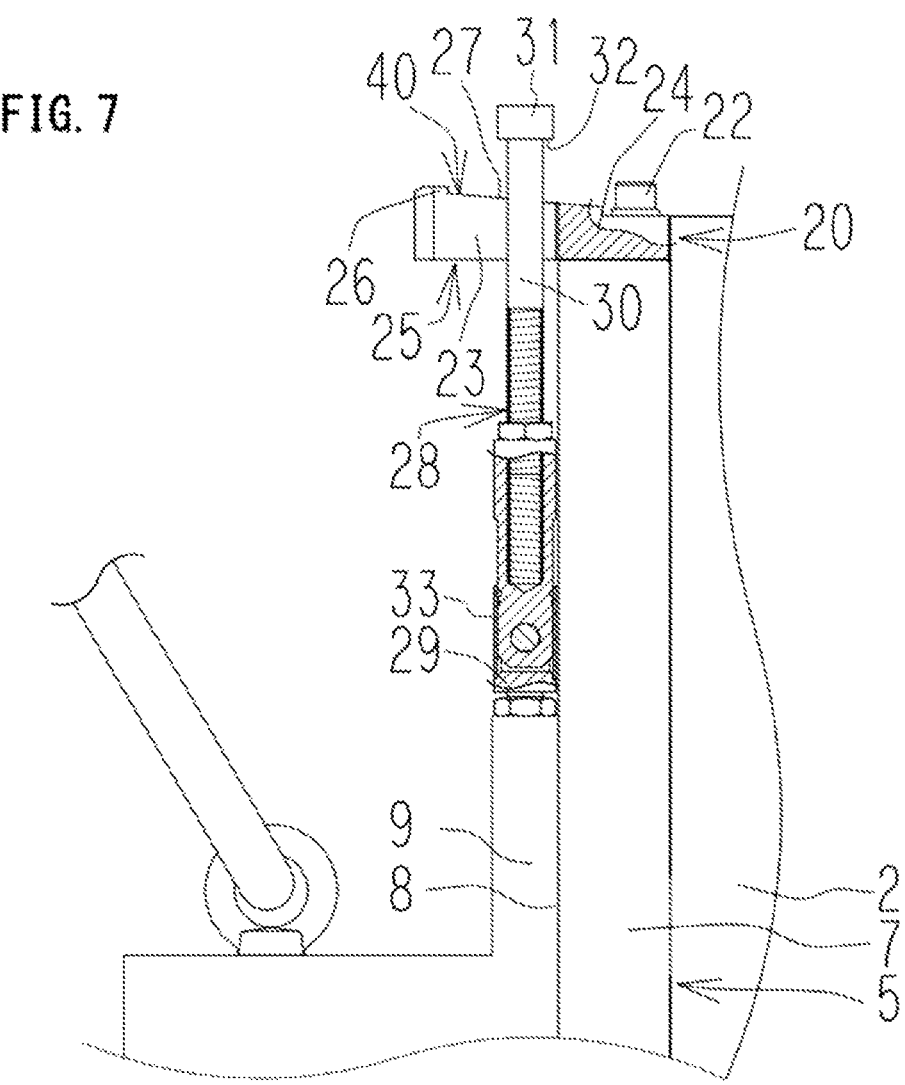
FIG. 7 shows a modification of the above embodiment and is a diagram showing a protruding member of the magnetic clamp device.
Figure 8:
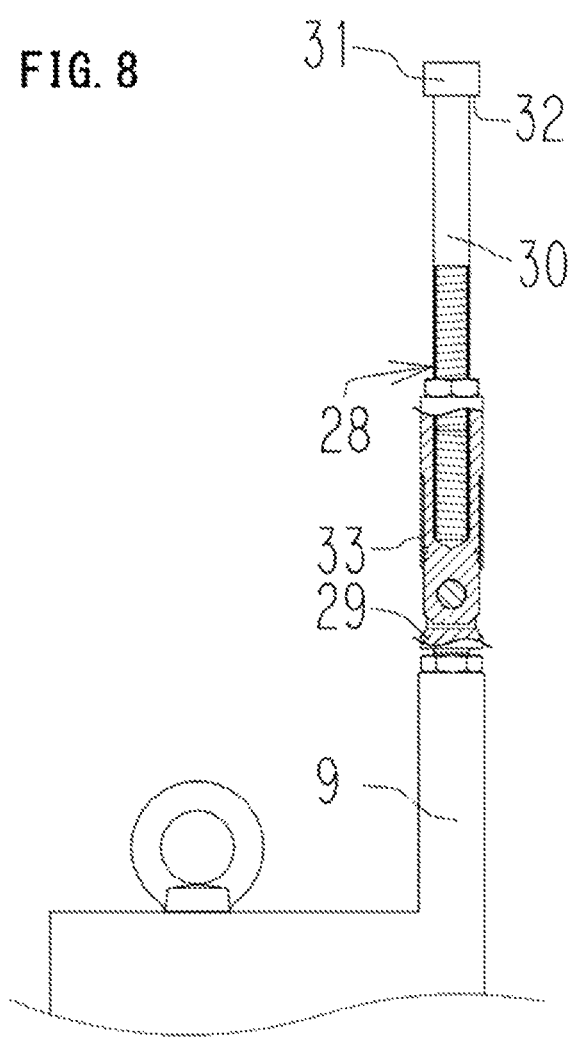
FIG. 8 is a diagram for explaining the operation of the protruding member, and is a diagram similar to FIG. 7.
Figure 9:
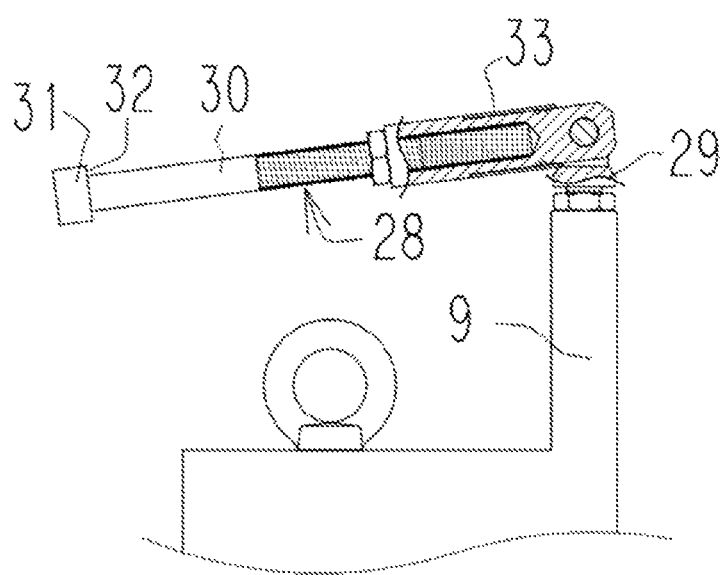
FIG. 9 is a diagram for explaining the operation of the protruding member, and is a diagram similar to FIG. 7.

FIGS. 7 to 9 show a modification of the above embodiment. In this modification, the same member (or similar member) of the above embodiment will be described with the same reference numerals as in principle. The points that this modification differs from the above embodiment are as follows.

As shown in FIG. 7, in the magnetic clamp device 5 of the above modification, a receiving surface 40 is formed (downward to the right) on the upper wall of the receiving portion 25 so as to be inclined with respect to the horizontal direction. Thereby, when the mold 9 adsorbed and fixed to the magnetic clamp devices 5 and 6 is unintentionally detached for some reason, the engagement portion 32 of the flange portion 31 having the protruding member 28 of the mold 9 is received by the locking portion 27 formed on the receiving surface 40 of a support member 20A. Thereafter, the mold 9 is moved to the magnetic plate 7 side along the receiving surface 40 by its own weight to approach the magnetic plate 7. Thereby, the mold 9 once separated from the magnetic clamp device 5 is supported by the magnetic clamp device 5 by the protruding member 28 and the support member 20, and the magnetic force by the magnetic clamp device 5 adsorbs and fixes the magnetic clamp device 5 again to the adsorption surface 8. Therefore, the mold 9 separated from the magnetic clamp device 5 can be reliably prevented from falling and being worn or damaged.

Further, as shown in FIGS. 7 to 9, a pivot branch 29 of the protruding member 28 is provided above the upper end surface of the mold 9, and the main body portion 30 of the protruding member 28 is pin-connected to the pivot branch 29 so as to be rotatable. The main body portion 30 is formed into a rod shape, and a flange portion 31 is protruded from the tip in the radial direction of the main body portion 30. An engagement portion 32 is formed on the lower surface of the flange portion 31. The main body portion 30 described above is configured so as to be inserted into the insertion hole 23 of the support member 20, and the engagement portion 32 of the flange portion 31 is configured so as to be received from below to the locking portion 27 of the receiving portion 25. Further, a cylinder member 33 is externally fitted to the main body portion 30, movable along the outer peripheral surface of the main body portion 30. Further, by moving the cylinder member 33 to the lower limit position, the cylinder member 33 can externally fit the main body portion 30 and the pivot branch 29 at the same time. Therefore, as shown in FIG. 8, when the cylinder member 33 is externally fitted only to the main body portion 30 by moving the cylinder member 33 to the upper limit position, the main body portion 30 can be rotated with respect to the pivot branch 29. Further, as shown in FIG. 7, when the cylindrical member 33 is externally fitted to the main body member 30 and the pivot branch 29, the main body portion 30 is restricted from rotating with respect to the pivot branch 29, and the main body portion 30 is maintained in a state of protruding upward from the upper surface of the mold 9. Therefore, when the mold 9 is not used, the protruding members 28 can be rotated and folded as shown in FIG. 9. This makes the mold 9 compact and easy to store when storing the unused mold 9 in a storage shelf (not shown) or the like, and also prevents the protruding member 28 from being worn or damaged by contact with peripheral equipment or the like.

FIG. 10 shows another modification of the above embodiment. In this other modification, the same member (or similar member) as the constituent member of the above embodiment will be described with the same reference numerals as a rule. The points that this modification differs from the above embodiment are as follows.

As shown in FIG. 10A, in a pair of magnetic clamp devices 5 and 6 of other modification, an elongated hole 41 penetrating the support member 20 is provided. The elongated hole 41 is long in a direction x in which the movable platen 3 moves from the adsorption surface 8, allowing the support member 20 to be fixed by protruding forward or retracting from the adsorption surface 8 of the magnetic plate 7. Besides, a spacer 42 absorbs the difference in level between the magnetic plate 7 and the bases 2 and 3 so that the support member 20 can retract without interfering with the bases 2 and 3.

In FIG. 10B, the support member 20 retracts without protruding into the direction x. In FIG. 10C, the bolt 22 is loosened and the support member 20 is slid into the elongated hole 41 in the direction x so that the receiving portion 25 protrudes from the adsorption surface 8. A mold 9 connecting a fixed mold 9a and a movable mold 9b is suspended and carried between the fixed platen 2 and the movable platen 3. An insertion hole 23 is formed between the two receiving portions 25. In FIG. 10D, first, a main body portion 30 of a protruding member 28 of the fixed mold 9a is inserted into the insertion hole 23 of the support member 20, and the fixed mold 9a and the adsorption surface 8 on the clamp device 5 side are in close contact. At this time, a main body portion 30 of a protruding member 28 of the movable mold 9b and the insertion hole 23 of the support member 20 of the movable mold 9b are facing each other on a dashed line y. The insertion hole 23 extends to the direction x in which the movable panel 3 moves, and the opening of the insertion hole 23 is arranged so as to face the main body portion 30 provided in the movable mold 9b. Next, the movable platen 3 is moved toward the fixed platen 2 in the direction x, and the mold 9 is sandwiched between the magnetic clamp devices 5 and 6. By keeping the direction of the dashed line y consistent with the direction x, the dashed line y is a line of movement of the insertion hole 23 when the movable platen 3 moves. In FIG. 10E, since the main body portion 30 of the protruding member 28 of the movable mold 9b exists on the line of movement of the insertion hole 23, the main body portion 30 is automatically inserted into the insertion hole 23 of the support member 20. The movable mold 9b and the adsorption surface 8 on the clamp device 6 side are in contact, and the operator operates the magnetic control device 19 to magnetically adsorb and fix the mold 9 to the magnetic plate 7 with the magnetic clamp devices 5 and 6. If the fixed mold 9a and the movable mold 9b are unsuspended and disconnected from the connection by the fixed metal fittings 10, installation on the injection molding machine 1 is completed. Thus, once the fixed mold 9b is brought into contact with the adsorption surface 8 on the clamp device 5 side, and then, the movable platen 3 is moved toward the fixed platen 2, the flange member 32 can be automatically moved directly above the support member 20.

Each of the above embodiments can be modified as follows.

The adsorption object is not limited to the illustrated mold 9 and may be a workpiece or the like.

The support member 20 is not limited to being protruded one from the upper part of the magnetic plate 7, but may be protruded more than one. In this case, the protruding member 28 of the mold 9 is supported by all or some of the plurality of support members 20. Further, it is not limited to supporting one protruding member 28 with one support member 20. A plurality of support members 20 may be used to support one protruding member 28. Alternatively, a single support member 20 may support a plurality of protruding members 28. Further, the support member 20 is not limited to being bolted to the upper part of the magnetic plate 7, and may be fixed to the fixed platen 2 or the movable platen 3.

Instead of the receiving portion 25 and the protrusion 26 of the support member 20 being integrally formed, the receiving portion 25 and the protrusion 26 may be formed as separate members. In this case, the protrusion 26 is attached to the receiving portion 25 via a plate spring member, and the plate spring member is configured to urge the protrusion 26 toward the adsorption surface 8 side with respect to the receiving portion 25. Thereby, when the protrusion 26 receives the protruding member 28 of the mold 9, the protruding member 28 is pushed to the adsorption surface 8 side via the protrusion 26 by urging force of the plate spring member. Accordingly, there is more opportunity for the mold 9 to be re-adsorbed to the magnetic plate 7.

In addition, it goes without saying that various changes can be made within the range that a person skilled in the art can imagine.

EXPLANATION OF THE CODE 2, 3 base
7 magnetic plate
8 adsorption surface
9 mold (adsorption object)
11 housing hole
13 coil
15 first permanent magnet
16 magnetic pole members
17 second permanent magnet
20 support member
27 locking portion
28 protruding member
31 flange portion
32 engagement portion
40 receiving surface

The invention claimed is:
1. A magnetic clamp device, comprising:
a magnetic plate provided on a side wall of a base;
an adsorption surface formed on a side wall of the magnetic plate, magnetically adsorbing an adsorption object at a predetermined position on the adsorption surface,
a first permanent magnet being inserted into a housing hole formed in the magnetic plate;
a coil wound around an outer periphery of the first permanent magnet;
a magnetic pole member being in contact with the first permanent magnet and being formed from a magnetic material;
a second permanent magnet mounted between an outer peripheral surface of the magnetic pole member and an inner peripheral surface of the housing hole;
a support member protruding from an upper part of the base or the magnetic plate in a direction intersecting the adsorption surface;
a protruding member protruding from the adsorption object, and having an engagement portion configured so as to be received from below by a locking portion provided on the support member, and
wherein the engagement portion is arranged above the locking portion so as to face the locking portion with a predetermined gap therebetween in a state where the adsorption object is adsorbed and fixed at a predetermined position on the adsorption surface, and
wherein a main body portion of the protruding member is screwed to a female threaded hole formed on the upper part of the adsorption object in a vertical direction and a flange portion of the protruding member is protruded in a radial direction of the main body portion from a tip end portion of the main body, thereby the flange portion provides the engagement portion,
wherein the support member has two receiving portions disposed above the adsorption surface and protruding horizontally from the adsorption surface, so as to provide a space sandwiched between the two receiving portions into which the main body portion can be inserted,
wherein the locking portion is formed on an upper surface of each of the two receiving portions.
2. The magnetic clamp device of claim 1, wherein the upper surface of each of the two receiving portions is inclined with respect to a horizontal direction and to decrease in height as approaching the adsorption surface, and the engagement portion is provided on a lower wall of the flange portion.
3. A magnetic clamp device, comprising:
a pair of magnetic plates, wherein one of the pair of magnetic plates being provided on a side wall of a fixed platen and the other of the pair of magnetic plates being provided on a side wall of a movable platen so as to face each other;
an adsorption surface formed on a side wall of each of the pair of magnetic plates for magnetically adsorbing a fixed mold or a movable mold at a predetermined position;
a first permanent magnet inserted into a housing hole formed in at least one of the pair of magnetic plates;
a coil wound around an outer periphery of the first permanent magnet;
a magnetic pole member being in contact with the first permanent magnet and being composed of a magnetic material;
a second permanent magnet mounted between an outer peripheral surface of the magnetic pole member and an inner peripheral surface of the housing hole;
a support member protruding from an upper part of each of the fixed platen and the movable platen or the pair of magnetic plates in a direction in which the movable platen moves with respect to the adsorption surface, and said support member being provided with two receiving portions disposed above the adsorption surface and protruding horizontally from the adsorption surface, whereby between the two receiving portions an insertion hole is formed;
a protruding member protruding from each of the fixed mold and the movable mold, and having an engagement portion configured so as to be received from below by a locking portion provided on the two receiving portions of a corresponding support member, and
wherein a main body portion of the protruding member is screwed to a female threaded hole formed on the upper part of the adsorption object in a vertical direction and a flange portion of the protruding member is protruded in a radial direction of the main body portion from a tip end portion of the main body member, thereby the flange portion provides the engagement portion, and
wherein the protruding member on the movable mold side and the insertion hole on the moveable mold side are arranged so that the protruding member on the movable mold side faces the insertion hole on the movable mold side in the direction when the fixed mold comes in contact with a corresponding adsorption surface in a state where the fixed mold and the movable mold are connected, and the main body of the protruding member on the movable mold side being configured to be inserted in the insertion hole on the moveable mold side by movement of the movable platen.
4. A magnetic clamp device, comprising:
a magnetic plate provided on a side wall of a base;
an adsorption surface formed on a side wall of the magnetic plate, magnetically adsorbing an adsorption object at a predetermined position on the adsorption surface,
a first permanent magnet being inserted into a housing hole formed in the magnetic plate;
a coil wound around an outer periphery of the first permanent magnet;
a magnetic pole member being in contact with the first permanent magnet and being formed from a magnetic material;

a second permanent magnet mounted between an outer peripheral surface of the magnetic pole member and an inner peripheral surface of the housing hole;

a support member protruding from an upper part of the base or the magnetic plate in a direction intersecting the adsorption surface;

a protruding member protruding from the adsorption object, and having an engagement portion configured so as to be received from below by a locking portion provided on the support member, and wherein the engagement portion is arranged above the locking portion so as to face the locking portion with a predetermined gap therebetween in a state where the adsorption object is adsorbed and fixed at a predetermined position on the adsorption surface, and wherein the support member has a space into which the protruding member can be inserted, wherein when the engagement portion is received by the locking portion, at least a portion of the protruding member is disposed above an uppermost surface of the magnetic plate.

5. The magnetic clamp device of claim 4, wherein a flange portion is connected to a vertically extending main body of the protruding member, a portion of the vertically extending main body is threaded into a female threaded and vertically extending hole formed in the upper part of the adsorption object and the flange portion of the protruding member protrudes in a radial direction of the vertically extending main body from an upper portion of the vertically extending main body.

6. The magnetic clamp device of claim 4, wherein the support member includes two receiving portions which extend horizontally and inwardly from the adsorption surface, wherein the two receiving portions form the space.

* * * * *